UNITED STATES PATENT OFFICE.

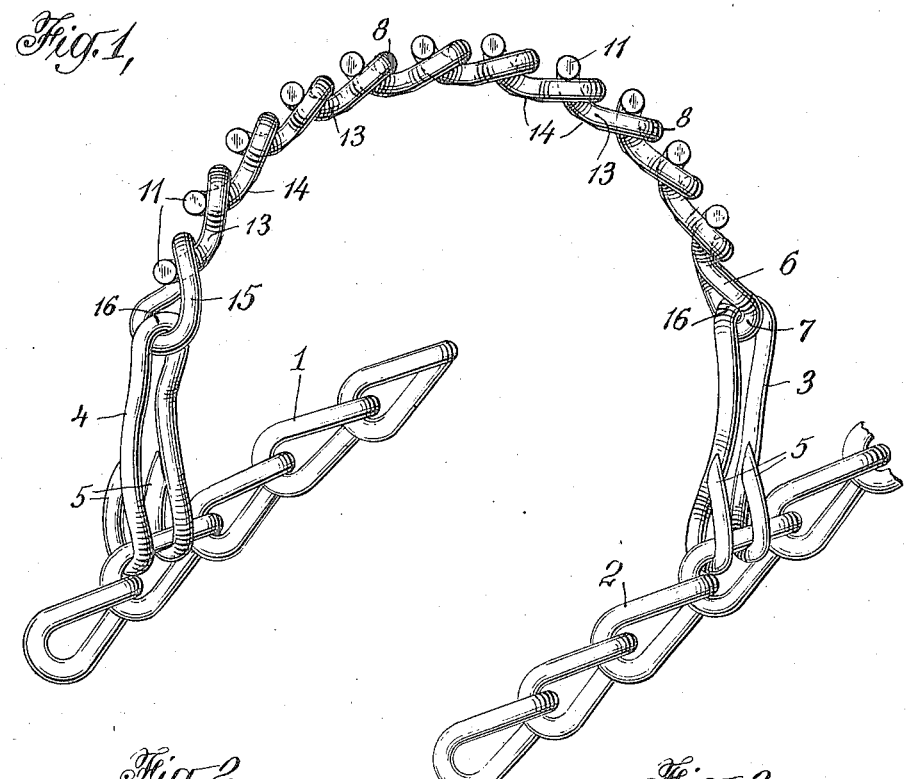

JOHN R. REYBURN, OF FAIRFIELD, CONNECTICUT, ASSIGNOR TO AMERICAN CHAIN COMPANY, INCORPORATED, OF BRIDGEPORT, CONNECTICUT, A CORPORATION OF NEW YORK.

CHAIN TIRE-GRIP.

1,263,926.  Specification of Letters Patent.  Patented Apr. 23, 1918.

Application filed April 7, 1917, Serial No. 160,412. Renewed March 14, 1918. Serial No. 222,507.

*To all whom it may concern:*

Be it known that I, JOHN R. REYBURN, a citizen of the United States, and resident of Fairfield, Fairfield county, State of Connecticut, have made a certain new and useful Invention Relating to Chain Tire-Grips, of which the following is a specification, taken in connection with the accompanying drawing, which forms part of the same.

This invention relates especially to chain tire grips in which the flexible side members are connected to a number of chain tread members having links of such construction as to engage and grip the roadway and thus increase the traction of the wheel and also give increased wear.

In the accompanying drawing showing in a somewhat diagrammatic manner illustrative embodiments of this invention, Figure 1 is a perspective view showing a tread member and the connected parts of the side members of one of these chain grips of the Weed type.

Fig. 2 is a top view of a straight series of tread links thereof.

Fig. 3 is a bottom view of the same.

Fig. 4 is a side view of such links.

Fig. 5 is a similar side view showing a modified construction.

Fig. 6 is a top view showing still another form of tread links; and

Fig. 7 is a side view thereof.

As indicated in the drawings, the chain grip for use on automobile tires, or the like, may comprise any suitable side members 1, 2, of flexible character which may be conveniently formed of chain having their ends connected at the sides of the wheel or tire in the well known way. The tread members which extend at intervals around the tire may be secured to the side members of the chain grip by suitable attaching links or means, such as 3, 4, which may, if desired, have a plurality of hooks 5 preferably closed around the links of the corresponding side member and somewhat separated to prevent twisting. The securing loop 16 on these attaching links preferably closely engages the link at the end of the tread chain or member and the attaching links are also preferably formed with reduced or narrowed necks adjacent this loop so as to prevent the tread member working down into the other end of the link. In this way the tread chains are securely held between the side chains or members and their twisting at the ends is substantially prevented by the character of the attaching means employed.

The tread chains are preferably composed of links of high carbon or special steel, or steel or other material which has been suitably case hardened so that they are stiff and rigid and also have ample wearing properties and toughness to resist the hard usage to which they are subjected. These tread chains are also preferably formed of links which are substantially flat where they engage a tire especially adjacent the outer or roadway engaging portions of the tire or tread chain while the tread chain is preferably provided on its opposite or outer side with projecting or roadway gripping portions to increase the traction of the wheel. A suitable form for such roadway gripping wearing links 8 for the tread members is shown in Figs. 1 to 4, each link comprising an eye 9 from which the round or other link material merges into the neck portions, 17, 18, which are preferably substantially parallel at the point where they extend through the eye of the adjacent link and where, if desired, they may be forced into actual contact at the point 12 in Figs. 2 and 3. The ends of the link material are preferably flared or bent apart to form the holding gripping hooks, 10, 11 which hold the link in interlocked relation with the adjacent link and also serve to project at the outer side of the tread chain so as to engage the roadway and give increased traction thereon by biting into the road material. It is also advantageous to give the eye 9 of each of these links a substantially elliptical or transversely extending oval contour and thus enable the eye to closely embrace the adjacent neck portions 17, 18 so as to prevent undesirable twisting with respect thereto which in connection with the oppositely flared hook ends of the links prevents the tread chain from twisting around out of alinement and keeps its flattened inner portion in engagement with the tire, in connection with which each link may, if desired, be formed with suitable flattened portions 14 to decrease wear. As shown in Fig. 4 the gripping hooks of the links, such as 11, may be bent outward away from the tire and the eyes 8 may be arranged in angular position above or outside of the portions 13 of the adjacent links so as to be somewhat removed from the engaging surface of the tire, although it is in some instances still more desirable to form the links with eyes which have outwardly bent end portions 19 to overlie the corresponding portions 20 of the hooks ends 31 of the link, preferably curved inward or downward as the links are shown in Fig. 5. In this way the links are enabled to lie in closer or flatter engagement with the adjacent tread portion of the tire which is more desirable for some purposes.

Another arrangement of generally similar gripping wearing links is shown in Figs. 6 and 7 in which the links are shown considerably longer so that their extended looped ends 21 may accommodate the midportion of the adjacent link and also be gripped by the holding gripping hooks 27 of the succeeding link so that each link extends through two adjacent links and gives a correspondingly greater amount of material and prolongs the life of the device correspondingly. As shown in Fig. 7 the portions 24 of the eyes may be bent upwardly or outwardly away from the tire so that the links may be arranged in a correspondingly flatter or closer inward position on the tire.

The roadway gripping wearing links may be secured to the attaching links described in any suitable way so as to hold the tread links in the desired straight untwisted position and Fig 1 shows such an arrangement somewhat diagrammatically in which one of the links 6 is given a special twisted or curbed form so that its eye is arranged at an angle to properly coöperate with and preferably closely engage the attaching loop 16 and maintain the tread member in proper angular position at that end. A special curbed connector link 15 may be arranged at the other end of the tread member so as to closely engage the ends or gripping hooks 10, 11 of the last link, although, of course, any other desired means may be employed for attaching such special wearing links in proper relation to the side chains or members of the grip.

This invention has been described in connection with a number of illustrative embodiments, proportions, sizes, uses, shapes, materials and parts, to the details of which disclosure the invention is not, of course, to be limited, since what is claimed as new and what is desired to be secured by Letters Patent is set forth in the appended claims:

1. The chain tire grip comprising side members and connected tread members formed with attaching means secured to said side members, each tread member comprising a plurality of interlocking roadway gripping wearing links adjacent the tread of the tire, each of said links being formed of substantially round stock and having a transversely extending eye and connected substantially parallel neck portions in substantial contact with each other and closely embraced by the eye of another link and oppositely flaring hardened gripping hooks engaging the eye of the adjacent link and adapted to engage the roadway, said hooks and the end of the eye of each of such wearing links being bent outward away from the body portion thereof coöperating with the tread portion of the tire.

2. The chain tire grip comprising side members and connected tread members, each comprising a plurality of interlocking roadway gripping wearing links adjacent the tread of the tire, each of said links being formed of substantially round stock and having a transversely extending eye and connected neck portions in substantial contact with each other and closely embraced by the eye of another link and oppositely flaring hardened gripping hooks engaging the eye of the adjacent link and adapted to engage the roadway.

3. The chain tire grip comprising side members and connected tread members, each comprising a plurality of interlocking roadway gripping wearing links adjacent the tread of the tire, each of said links being formed of substantially round stock and having an eye and connected portions in substantial contact with each other and embraced by the eye of another link and oppositely flaring hardened gripping hooks engaging the eye of the adjacent link and adapted to engage the roadway.

4. The chain tire grip comprising chain side members and connected tread members each formed with removable attaching links having hook ends interlocking with said side chains at separated points on each side chain, each tread member comprising a plurality of hardened interlocking roadway gripping wearing links adjacent the tread of the tire, each of said links having an eye and connected substantially parallel neck portions in substantial contact with each other and closely embraced by the eye of another link and oppositely diverging gripping hooks engaging the eye of the adjacent link and adapted to engage the roadway, said hooks and the end of the eye of each of such wearing links being bent outward away from the body portion thereof coöperating with the tread portion of the tire.

5. The chain tire grip comprising chain side members and connected tread members each formed with separated portions interlocking with said side chains, each tread member comprising a plurality of hardened interlocking roadway gripping wearing links adjacent the tread of the tire, each of said links having an eye and connected substantially parallel neck portions in substantial contact with each other and embraced by the eye of another link and oppositely diverging gripping hooks engaging the eye of the adjacent link and adapted to engage the roadway, said hooks and the end of the eye of each of such wearing links being bent outward away from the body portion thereof coöperating with the tread portion of the tire.

6. The chain tire grip comprising chain side members and connected tread members each formed with separated portions interlocking with said side chains, each tread member comprising a plurality of hardened interlocking roadway gripping wearing links adjacent the tread of the tire, each of said links having an eye and connected neck portions in substantial contact with each other and embraced by the eye of another link and diverging gripping hooks engaging the eye of the adjacent link and adapted to engage the roadway.

7. The chain adapted for use as the tread portion of a chain tire grip comprising a plurality of hardened interlocking roadway gripping wearing links for use adjacent the tread of the tire, each of said links being formed of round stock and having a transversely extending eye and connected substantially parallel neck portions in substantial contact with each other and closely embraced by the eye of another link and oppositely flaring gripping hooks engaging the eye of the adjacent link and adapted to engage the roadway, said hooks and the end of the eye of each of such wearing links being bent outward away from the body portion thereof adapted to coöperate with the tread portion of the tire.

8. The chain adapted for use as the tread portion of a chain tire grip comprising a plurality of hardened interlocking roadway gripping wearing links for use adjacent the tread of the tire, each of said links being formed of round stock and having a transversely extending eye and connected substantially contracting neck portions closely embraced by the eye of another link and outwardly bent gripping hooks engaging the eye of the adjacent link and adapted to engage the roadway.

9. The chain adapted for use as the tread portion of a chain tire grip comprising a plurality of hardened interlocking roadway gripping wearing links for use adjacent the tread of the tire, each of said links being formed of round stock and having a transversely extending eye and connected substantially parallel neck portions in substantial contact with each other and closely embraced by the eye of another link to minimize twisting distortion of the links of the chain while allowing them to bend in a plane extending between said neck portions and gripping hooks engaging the eye of the adjacent link and adapted to engage the roadway.

10. The chain adapted for use as the tread portion of a chain tire grip comprising a plurality of interlocking roadway gripping wearing links for use adjacent the tread of the tire, each of said links having an eye and connected closely arranged neck portions closely embraced by the eye of another link and oppositely diverging gripping hooks engaging the eye of the adjacent link and adapted to engage the roadway.

11. The chain tire grip comprising chain side members and connected tread members comprising a plurality of interlocking roadway gripping wearing links adjacent the tread of the tire, each of said links having an eye and connected neck portions closely embraced by the eye of another link, and oppositely diverging gripping hooks engaging the eye of the adjacent link and adapted to engage the roadway.

JOHN R. REYBURN.

Witnesses:
　WALTER F. FITZGERALD,
　WM. C. ETTERSHANK.